United States Patent
Boddy et al.

(10) Patent No.: US 7,505,827 B1
(45) Date of Patent: Mar. 17, 2009

(54) AUTOMATED FINITE CAPACITY SCHEDULER

(75) Inventors: Mark S. Boddy, St. Paul, MN (US); Daniel P. Johnson, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/188,399

(22) Filed: Nov. 6, 1998

(51) Int. Cl.
*G06F 19/00* (2006.01)

(52) U.S. Cl. .................................. 700/100; 700/103
(58) Field of Classification Search ............ 700/95, 700/103, 97, 99–102; 705/7–9; 706/62; 713/2
See application file for complete search history.

(56) References Cited

U.S. PATENT DOCUMENTS

| | | | |
|---|---|---|---|
| 5,148,370 A | 9/1992 | Litt et al. | 700/95 |
| 5,195,172 A * | 3/1993 | Elad et al. | 706/62 |
| 5,353,229 A * | 10/1994 | Tanaka | 700/103 |
| 5,671,361 A | 9/1997 | Brown et al. | 705/9 |
| 5,787,000 A | 7/1998 | Lilly et al. | 364/468.01 |
| 5,894,571 A * | 4/1999 | O'Connor | 713/2 |
| 6,216,109 B1 * | 4/2001 | Zwebwn et al. | 705/8 |

FOREIGN PATENT DOCUMENTS

EP 0306965 A 3/1989

OTHER PUBLICATIONS

Goldman R P et al: "A Constaint-Based Scheduler For Batch Manufacturing" IEEE Expert, US, IEEE Inc., New York, vol. 12, No. 1, 1997, pp. 49-56.*

Malin, J. T., "Statement of Interest: Designing Model-Based Autonomous Systems for Coordinated Acquisition and Maintenance of Models and Procedures", *Model-Directed Autonomous Systems*, American Association for Artificial Intelligence, Compliation Copyright 1997, 39-40, (1997).

Goldman R P et al: "A Constraint-Based Scheduler for Batch Manufacturing" IEEE Expert, US. IEEE Inc., New York, vol. 12, No. 1, 1997, pp. 49-56 XP000689724.

* cited by examiner

*Primary Examiner*—Albert DeCady
*Assistant Examiner*—Steven R Garland
(74) *Attorney, Agent, or Firm*—Kris T. Fredrick

(57) ABSTRACT

A scheduler for a finite capacity process provides a schedule based on an integrated assessment of both discrete and continuous constraints. Given a list of products to be provided, the scheduler generates a set of activities required to produce the products and identifies resources required and the discrete and continuous constraints related to such resources. Activities are resized, and timelines are established for the activities as a function of deadlines for the product delivery for which the activities are related. Resource balancing heuristics are used to redistribute resource utilization to prevent bottlenecks. Data structures are used to keep track of constraints. Both discrete and continuous constraints are defined. Separate solver engines for the discrete and continuous constraint problems modify the constraints. The data structures are used to share and propagate constraints between the two engines. Infeasibilities of meeting product delivery times are detected during the scheduling and backtracking and rescheduling of resources based on under and over utilization and availability of equivalent resources is performed.

20 Claims, 3 Drawing Sheets

AUTOMATED FINITE CAPACITY SCHEDULER

FIELD OF THE INVENTION

The present invention relates to scheduling events, and in particular to automated finite capacity scheduling.

BACKGROUND OF THE INVENTION

Manufacturing of multiple products in a single factory or plant can lead to very complex scheduling problems. Individual pieces of equipment or "resources" may be used to make some products, and not others. Many complex processes involve different types of constraints. For instance, when processing fluids, pipes may carry fluids from one tank to another. It may not be possible to transfer the fluids directly from one tank to any other tank without first going through several tanks. These types of constraints are referred to as discrete or mode choice constraints. They are fairly static in nature. A second type of constraint is continuous or dynamic in nature. These types of constraints involve the duration of an activity, such as how long is a valve open and causing fluid to flow in a pipe, the maximum flow rate of the pipe, and how long between different activities is required.

The operation of a plant may be viewed at several different functional levels. A first level is the physical plant level, which involves operating the resources of the plant to produce products. A second, higher level of functionality involves the scheduling of which products to make at any given time. The schedule is limited by the resource constraints described above, and by an overall planning function, which describes how much of each product to produce to meet desired or promised quantities of products to customers over a given interval of time. This interval of time will vary depending on the types of product being made and the dynamics of the marketplace for that product.

The combination of marketplace demands, and discrete and continuous constraints on the production of the products makes resource scheduling and operation of the plant an extremely complex matter. Further complications include the availability of raw materials on the front end of manufacturing processes, and how quickly product can be removed from the back end of the process. Plants may also be run suboptimally at times to meet production deadlines of certain customers.

Prior attempts at solving these complexities relied on the knowledge of plant operators to schedule activities to try to meet the schedules that came down from above. The schedulers would rely on their past experience to estimate the feasibility of the schedules they propounded. The operators would also do their best, relying on past experience and detailed knowledge of their plant. Clearly, this was at best a hit or miss proposition for meeting such schedules, much less obtaining efficient operation of the plant.

Some automated methods of solving the scheduling problem provided independent sequential solution of the discrete and continuous constraint problems. These have resulted in substantially suboptimal behavior and inflexible resolution of operations upsets. Linear models have also been tried but have been quite limited in the amount of complexity they can handle without resulting in the model itself becoming too complex. They have also proven very inflexible and difficult to update in real time. Simulations have also proven quite inflexible and some, generate and test types of simulations, have proven undirected and inefficient.

One system described in U.S. Pat. No. 5,787,000 "Method and Apparatus for Scheduling Work Orders in a Manufacturing Process" describes previous systems as lacking the ability to perform event oriented scheduling prior to the mid-1980's. Further developments in the late 1980's and early 1990's added the ability to perform event oriented scheduling, but lacked the ability to generate multiple schedules based on resource capacity for individual resources. The U.S. Pat. No. 5,787,000 patent describes the ability to schedule work orders in a manufacturing facility using a finite, event-oriented scheduling process which takes into account the availability of materials and resources to be used in the manufacturing process. However, it lacks the ability to account for multiple types of constraints that are common in more complex manufacturing situations. Further, it lacks the ability to take into account constraints between resources.

There is a need for a scheduler that is flexible and can efficiently generate feasible schedules in the face of thousands of constraints. There is a need for a scheduler that can generate schedules which optimize plant resource utilization to provide product in a timely fashion. There is a further need for a scheduler that can recognize and reschedule when infeasibilities in proposed schedules are encountered.

SUMMARY OF THE INVENTION

A scheduler for a finite capacity process provides a schedule based on an integrated assessment of both discrete and continuous constraints. Given a list of products to be provided, the scheduler generates a set of activities required to produce the products and identifies resources required and the discrete and continuous constraints related to such resources. It then creates a schedule based on such constraints.

In one embodiment, once the activities and constraints are identified, activities are resized. In other words, if an activity is very slow, or large, it may be broken down into smaller activities, or in some instances, larger activities based on predetermined parameters. This allows greater flexibility and more optimal use of resources. Following the resizing, timelines are established for the activities as a function of deadlines for the product delivery for which the activities are related. In a further embodiment, a resource balancing heuristic is used to redistribute resource utilization to prevent bottlenecks. Activities are then scheduled while keeping track of the constraints.

A point of interest list for each resource is kept to identify when that resource is already utilized, and when it still may accommodate further activities. Each further activity is then scheduled based on the constraints and point of interest list for each resource.

Data structures are used to keep track of constraints. Both discrete and continuous constraints are defined as being of various types, including REQUIREMENT, DECISION, and PROPAGATION EFFECT. Separate engines are used to solve for the discrete and continuous constraint problems. Each engine modifies its respective constraints. The data structures are used to share and propagate constraints between the two engines.

Infeasibilities of meeting product delivery times are detected during the scheduling of each resource. Several methods may be used to backtrack and reschedule resources based on under and over utilization and availability of equivalent resources. One such method involves chronological back tracking with backjumping and dynamic variable ordering. Further methods include starting over with a different set of assumptions.

The scheduler may be applied to many different domains, including bus scheduling for computer systems, airline services and airport ground operations, satellite and spacecraft operations, transportation and logistics planning, refinery operations and air traffic management to name a few. It provides a flexible and efficient method to generate schedules in the face of thousands of discrete and continuous constraints. It also provides the ability to optimize plant resource utilization and to provide product in a timely fashion.

DETAILED DESCRIPTION

Figure 1:
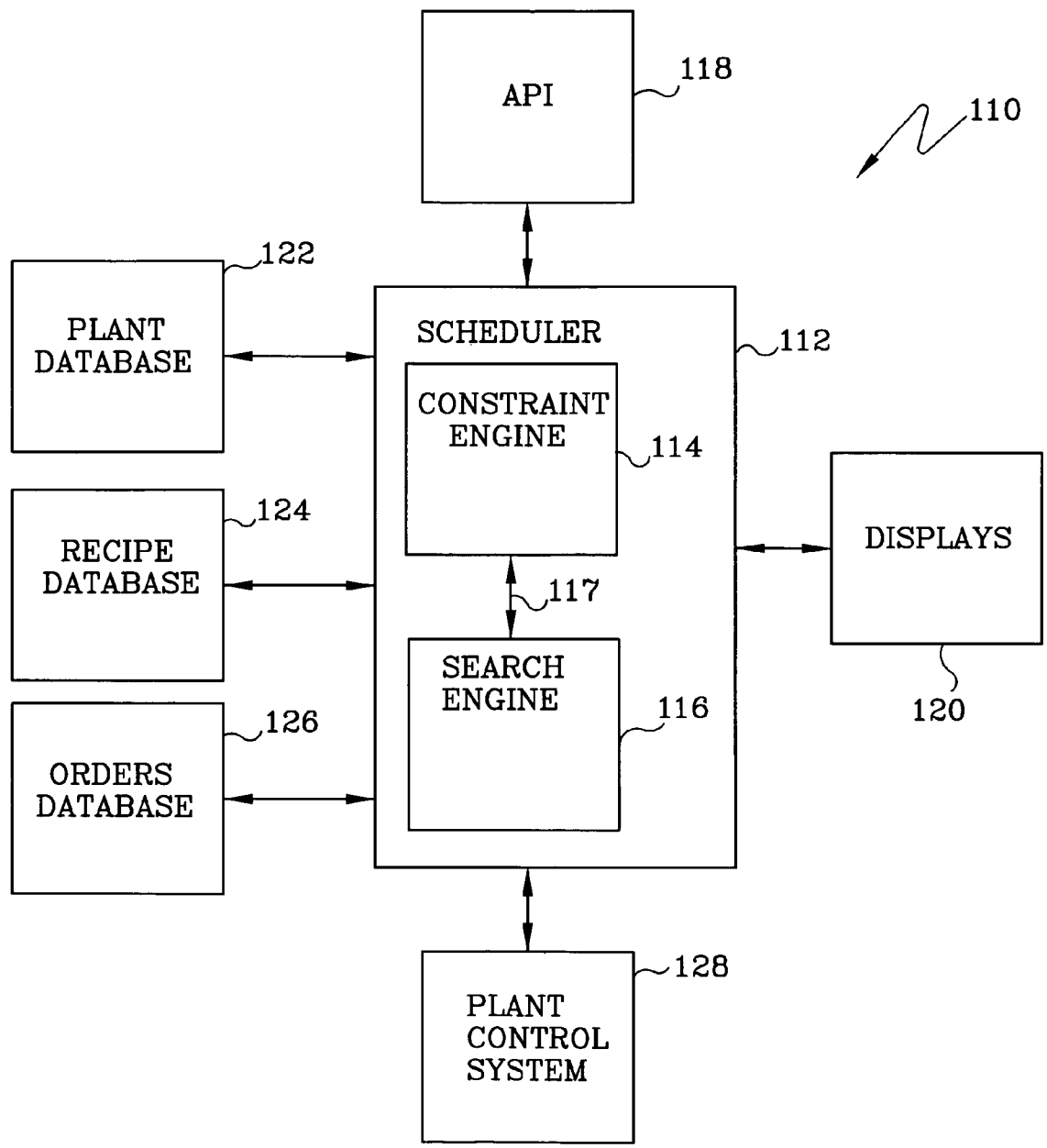
FIG. 1 is a block diagram of a scheduling system in accordance with the present invention.

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The description is divided into multiple sections. The first section provides an introduction to scheduling concepts, and an overview of a software based scheduling system architecture. The second section describes the operation of the scheduler in the context of blending gasoline in a refinery, one of many systems which can utilize the scheduling capabilities of the current invention. A third section describes the software in further detail, followed by a conclusion which describes benefits of the invention and further details.

The present invention involves the scheduling of tasks in many different types of settings. For example; operating a petroleum refinery involves a set of discrete decisions regarding how much to make of what products, in what order, and where to store them. Some examples of discrete parameters involve product sequencing, tank draws and storage, and piping configurations which constrain where product may be routed. Economical production of those products involves controlling a complex process best modeled as a set of non linear equations and inequalities over a continuous, n-dimensional space. Continuous parameters involve things like blend ratios, feed compositions and control setpoints. Control inputs and production decisions interact in complex ways. Certain production decisions (for example the manufacture of very small batches of product with rapid changeovers) are ruled out, based on the fact that the resulting plant operation would be badly suboptimal. Control inputs are in turn affected by production decisions: the plan may be run slightly sub-optimally in order to meet a production deadline for a valued customer.

Traditionally, the continuous and discrete aspects of scheduling systems have been addressed separately. Typically, the discrete problem is solved using simplifying assumptions about the continuous behavior of the resulting system operation. During execution, operators are faced with a choice between optimal operation, tending to diverge rapidly from the predicted schedule, and controlling the system to synchronize with the behavior assumed in the discrete solution, resulting in substantially suboptimal behavior. This lockstep, sequential control structure is both limiting and unnecessary.

Scheduling based on discrete aspects have reduced problems to constraint satisfaction problems (CSPs). The statement of a constraint satisfaction problem (CSP) includes a set of variables V={v1, v2, ..., vn}, taking on values from a set of domains D={d1, d2, ..., dn} and a set of constraints C. The domains in D may be discrete or continuous. The elements of C are relations of the domains in D, specifying allowable combinations of values for the variables in V. The typical form of "solution" for a constraint satisfaction problem is to find an assignment to all of the variables in V, drawn from the domains in D, such that all of the constraints in C are satisfied, or to determine that no solution exists. Constrained optimization problems (COPs) add to this an objection function or preference relation over the possible assignments to V. The problem is then to find a maximal (most preferred) assignment to V that satisfies C.

More simply put, when you have a number of tasks or activities to perform, you may have a number of resources, including both raw materials, and devices needed to work on the materials to produce and end product. Some devices may not work on some of the materials. This is referred to as a constraint. The problem is to find the right combination of devices and materials to optimize the performance of the tasks. If one particular device or tool is required to perform all of the tasks, it might not be feasible to perform all the tasks in time to meet productions schedules. Schedulers look at all the possible solutions, and try to find one that works within all the limitations or constraints that are applicable.

A simple example of trying to determine the order of three different tasks, A, B and C illustrates the potential complexity as well as the number of solutions which might need to be investigated. In a brute force approach, there are six potential solutions that must be considered. However, they are first solved locally, one inequality at a time. In other words, the first inequality might be whether A is performed before B (A<B) or B<A. Then whether A<C or C<A, and so on. One can see that for a large number of tasks, the computations increase exponentially. Many systems involve up to 30,000 tasks which need to be scheduled.

Constraint satisfaction and constraint optimization problems in either continuous or discrete domains can be stated in the same way. Given a set of variables, the objective is to find a corresponding set of assignments such that all constraints are satisfied. A system that integrates both continuous and discrete problem solvers is indicated generally at 110 in FIG. 1. The system implements a constraint envelope scheduling (CES) approach in which restrictions to a schedule are made only as necessary. Scheduling decisions are modeled as additional constraints to facilitate the design and implementation of schedulers that support iterative schedule negotiation and rescheduling, incremental schedule modification, conflict identification and repair, and on-line, real-time rescheduling in an operational environment.

Several data structures are used to keep track of discrete and continuous variables and constraints: The data structures may be in the form of delimiter separated fields, standard database format, or other format as desired for a particular implementation. Discrete variables are defined as having legal values, current constraints on assignable values and cross domain constraints which are constraints to be added to the continuous domain, depending on the value assigned to this variable. Discrete constraints are represented by n-ary relations on discrete-valued variables comprising legal combinations of values. Constraints may be of the type REQUIREMENT, DECISION, and PROPAGATION EFFECT. These types are somewhat self explanatory in the context of which they are used, but basically refer to whether the constraint is required, whether it involves the making of a decision based on other constraints or variable values, and also a specification of how the constraint should be propagated, and what its affect is on other variables and constraints. Discrete constraints are also represented by culprit identification bookkeeping involving identifications of decision variables responsible for this constraint being added. A further field or representation comprises a list of propagation methods to be invoked to propagate the constraint.

Continuous variables are represented by a representation of current constraints using an optimization of an objective function. Continuous constraints are similar to discrete constraints except that the relationship to other variables is specified as a linear mathematical relationship such as "=", "<=", etc on several variables. Otherwise, it may be of the same constraint type, contain the same culprit identification bookkeeping and similar identification of propagation methods.

The system 110 comprises an interval constraint engine (ICE) 114, which is a continuous side constraint-based temporal inference engine, and a flexible search engine 116 which is a discrete-side search-based problem solver. In one embodiment, continuous constraint engine 114 operates as a subroutine of the search engine 116. In a further embodiment, the constraint engine 114 and search engine 116 are integrated using a control architecture that grants significant autonomy and responsibility to the constraint engine 114. In essence, each engine checks respective continuous and discrete constraints, and each has the ability to add and delete sets of constraints through a control architecture represented by the double arrow line 117 connecting the constraint engine 112 with the search engine 116. The above described data structures are used to communicate the constraints and identify methods to be invoked to propagate the constraints between the two engines. Both feasibility of partial solutions and culprit identification when a set of constraints is not available or optimal are provided along with a variety of conflict resolution strategies involving reassignment, variable reordering, or constraint relaxation. The effects of decisions made in one problem domain (discrete or continuous) are propagated in both directions and ultimately through one or more cycles between the engines. The engines are incremental in the sense that sets of constraints are added or deleted, with efficient checks for consistence and other inference.

In operation, initially constraints are added incrementally to an initially under constrained continuous model, thus avoiding multiple local solutions in a continuous model. Culprit identification mapping from the continuous domain constraints involved in an infeasibility to the associated decision variables is performed. Pruning based on partial assignments are supported by monotonic constraints and explicit propagation through the continuous domain.

An application program interface (API) 118 is coupled to system 110 to provide the ability to interact with the engines and other functionality on a user level. This may involve the setting of constraints as well as reprogramming of the system to add further functionality. A set of displays 120 is also provided to give a graphical representation of the scheduling process as will be further shown and described below. A plant database 122 contains representations of the structure and operation of a manufacturing plant or set of resources that are operable together to perform sets of desired tasks. A recipe database 124 is also coupled to the system to provide information on the processes required to perform selected tasks which may be represented at a higher abstract level. An orders database 126 contains indications of the products which must be produced, and the time frame in which they must be delivered. Finally, a plant control system 128 is coupled to the system 110 and receives a schedule in a format conducive to the plant control system to actually control the plant to produce product in accordance with the schedule. The plant control system 128 also provides information back to the scheduling system 110 regarding progress on the schedule, allowing the system 110 to dynamically reschedule in the face of process upsets or unanticipated difficulties.

Figure 2:
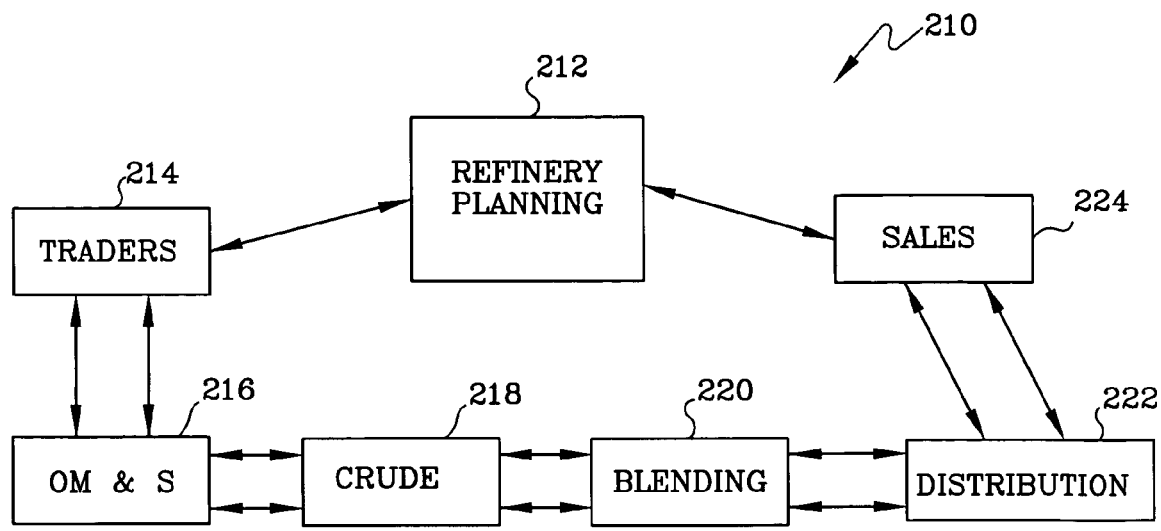
FIG. 2 is a high level block diagram of a refinery plant on which the scheduling system of FIG. 1 will operate.

Application of system 110 to a refinery example is described with respect to a block diagram representation of the refinery indicated generally at 210 in FIG. 2. A refinery planning function is indicated at 212. The refinery planning function operates with traders 214 to obtain information regarding how much crude stock is available for processing. Planning 212 also works with a sales function 224 which sells refinery products to distributors and retailers of gasoline and heating oil products, as well as other petroleum based products that refinery 210 is capable of producing. Refinery planning 212 must somehow coordinate with both the traders and the sales functions in order to obtain sufficient raw materials and to have sufficient resources to turn the raw materials into the products that have been sold. They also need to indicate to both functions how they must modify their behavior to optimally run the refinery.

The traders buy crude, which the OM&S function 216 causes to be placed in crude storage 218. From storage, a single simple operation is shown as a blending function 220, which provides blended products to a distribution function 222. Sales 224 is shown as coupled to the distribution function, which provides some feedback on how much of what products are available to sell and how schedules are being met.

Figure 3:
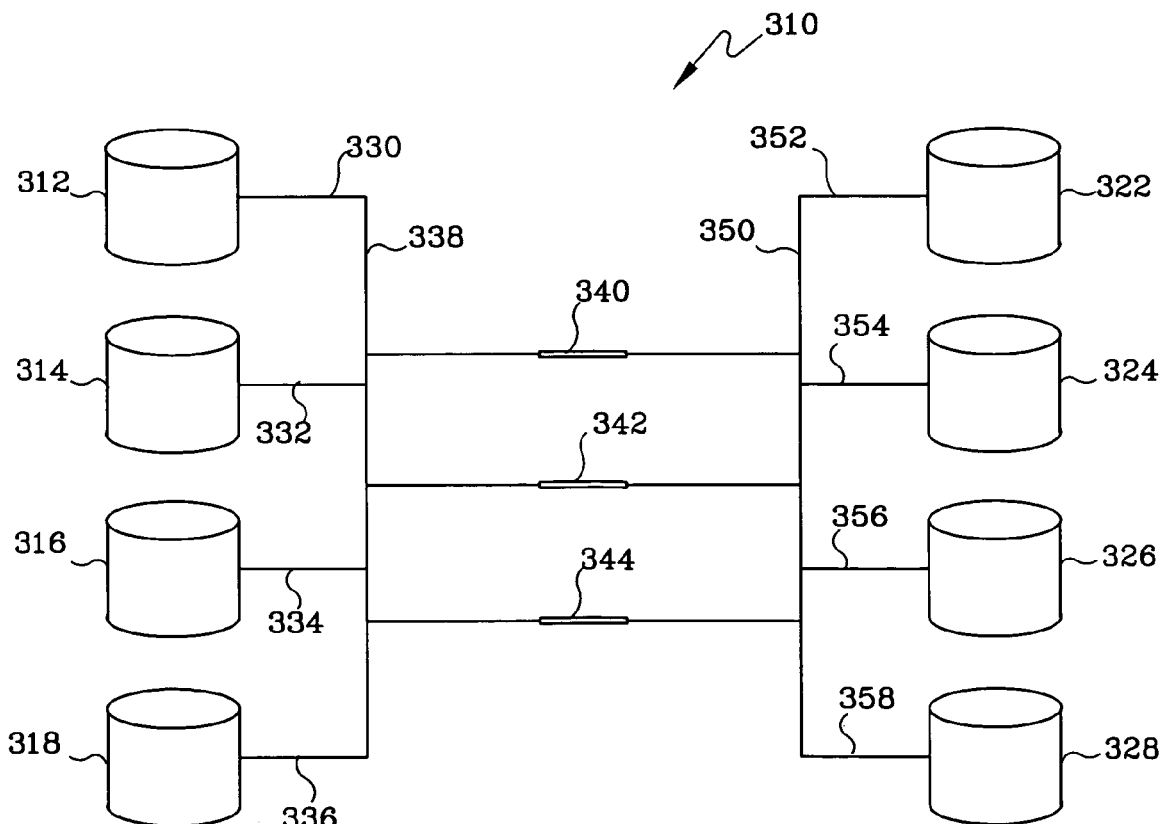
FIG. 3 is a simplified block diagram example of operation of a blending operation which occurs in the refinery of FIG. 2.

FIG. 3 provides a closer view of the blending function of FIG. 2 which is shown generally at 310. A blending operation may be thought of as taking different grades of gasoline, and mixing them together to form desired grades of gasoline. Many other operations occur in refineries, but this one is chosen as a simple example that illustrates operation of the current invention. Several storage tanks 312, 314, 316, and 318 are shown with respective feed pipes 330, 332, 334 and 336 coupled to a single feed line 338. Feed line 338 is coupled to three blenders 340, 342, and 344, which in turn are coupled to a feed line 350 and through pipes 352, 354, 356, and 358 to respective storage tanks 322, 324, 326, and 328. The pipes and lines are a simple representation of the possible fluid transport systems for a blending operation. They contain many flow meters and valves to monitor and control the flow of stock between the storage tanks. It should be understood that the lines and pipes are representative of multiple such connections, which are not shown as they are well known in the art. There are likely some routing constraints, as there may not be an actual path from storage tank 318 to blender 340. Further, some blenders may not be capable of performing a desired blend operation. For instance, blender 340 may not be capable of blending mid grade gasoline, but blender 342 is. When this is combined with routing constraints, it may result in only one blender being operable at any one time, whereas perhaps high and low grades could be processed simultaneously.

Figure 4:
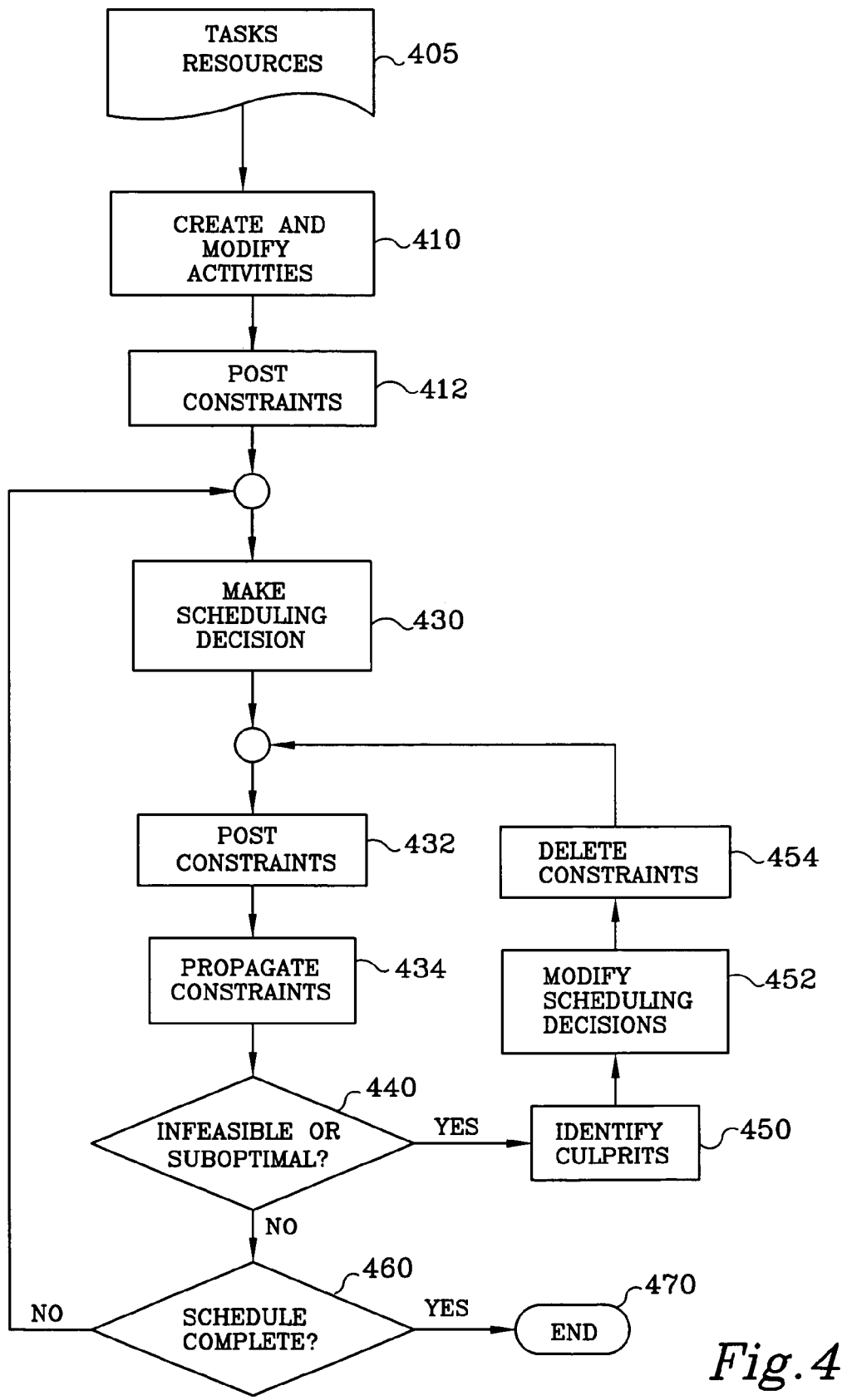
FIG. 4 is a high level flowchart of the operation of the scheduling system with respect to scheduling of multiple tasks.

In the context of the refinery 210 and blending function 310, a simplified flowchart in FIG. 4 illustrates the steps involved in scheduling the production of a desired set of blends of gasoline. The functions may be provided by software operating on a standard personal computer or other computer. In one embodiment, the software is written in Java or other suitable language and stored on computer readable medium such as a disk drive, or removable machine readable media, including carrier waves for transmission between systems. The scheduling system 110 may be used by planning 212 to control the refinery operations to produce the grades of gasoline which have been promised by the sales function by certain dates. The schedule is initially provided to the system 110 in the form of desired products with deadlines for delivery. The scheduler takes that set of products and creates a set of tasks and resources required at 405, and then creates activities needed to produce the products at 410. This is done using information contained in plant database 122 which identifies the resources available and routing information between resources, as well as the capabilities of the resources in the form of constraints. The recipe database 124 provides information on what activities or tasks are required to produce the desired products, and what resources are required to perform the activities.

Each activity is given a start and end bound defining how long it can run, and when it can start. These are continuous constraints. The activities correspond to shipments of product in one embodiment. Each shipment gets one blend activity with a recipe, amount and constraints on when it can be shipped. Further constraints include flow rate of the shipment. Certain shipment methods are slower than others. A pipeline can ship fluid at a very high rate, whereas a tanker truck can only be filled at a limited rate. This information is accumulated in the form of constraints. It is important when considering that a tank may be full, and only emptied at a slow rate, referred to as a slow drop. It would suggest that activities which further filled the tank may be delayed, whereas a tank being emptied by a pipeline, a fast drop, may result in activities which fill it being given a higher priority.

In one embodiment, activities are resized at 410 to provide a more granular approach which results in greater flexibility in scheduling. If certain activities are too slow, or too large, as determined by comparing the activities to predetermined thresholds or limits, they are broken into smaller activities that are more easily scheduled without disruption. The predetermined limits are may be based on size of tank or tanker trucks, or other limitations determined either empirically or based on known limitations of the refinery so as not to create bottlenecks or monopolize a critical shared resource. This modification of selected activities is thus a function of integrated implications of the discrete and continuous constraints.

At 412, constraints are posted or provided to the internal engines to guide subsequent steps. At 430, a timeline is created, and a next activity is scheduled. Activities are first selected by a sorted list of deadlines for the product delivery for which the activity was generated. Other methods are also available and may be easily implemented within the framework of the present invention. A timeline is created using the start and end times of the activities selected. Resources are assigned based on availability. Each resource is given a set of constraints which indicate when they are already scheduled as well as other continuous and discrete constraints already discussed.

A point of interest list is also created which indicates when the resource is scheduled, and may also be used to provide a load balancing heuristic, which takes into account how loaded the resource already is prior to assigning it to a new activity. The load balancing heuristic may also take into account the versatility of the resource in accordance with how many future activities may require the functionality of the that resource in a further embodiment. Each new scheduled activity results in many constraints being set, including a constraints related to the timing of the activity.

Once an activity has been scheduled at 430, the constraints are again posted at 432 and propagated at 434 based on the propagation methods specified in the data structures representing the constraints. A further function 440 checks the resulting set of constraints for infeasibility or suboptimal performance. If such is found, a culprit activity is found which lead to the unfeasibility, and the schedule may be modified at 452 if a different resource is available for performing the activity, or other more substantive changes to the schedule such as backtracking to the scheduling of the culprit may be performed. Selected constraints may be deleted or modified at 454 and are then posted again at 432 and again propagated. There are several methods available for backtracking, such as chronological backtracking with backjumping and dynamic variable ordering as is known in the art. If no infeasibility or suboptimal performance was found at 440, function 460 checks to see if more activities need to be scheduled. If so, flow returns to schedule function 430 to schedule the next activity. Through this iterative constraint envelope scheduling process, all activities are scheduled to meet their deadlines as closely as possible. When the last activity has been scheduled the process ends at 470. However, this is not the end, as the actual process is then monitored against the predicted schedule. As upsets occur, the constraints are modified to reflect the actual performance, and rescheduling may be performed simply by noting the remaining activities to be performed and running through the process again.

Further detail of the function of the schedule is specified in terms of inputs, functions, display features, schedule upsets and assumptions. Scheduler inputs comprise items which are specified as initial requirements on the schedule. Those inputs that can be changed dynamically are listed below as schedule upsets. The initial requirements comprise blendstock rundowns (piece-wise constant rates), shipment schedules (rate, segregation, start and end times), segregation capacities (max and min) belding header max, min, and default flow rates, product recipes, and product values (used to compute changeover costs).

System functions describe what a user can cause the scheduler to do. The scheduler can automatically generate a schedule from a set of requirements as described above and additionally report any detected infeasibility. One can introduce an upset, and view resulting inventory changes. Some upsets might actually fix an inventory problem. It can automatically reschedule to fix problems caused by an upset, display the current schedule at any point, and dump the current schedule in CSV format.

Display features include a timeline of specified blendstock rundown rates, shipments, predicted inventory levels over time, with segregation over/under capacity flagged, blend sequences for each header, with changeovers flagged, and changeover cost which is summarized for the current schedule.

Schedule upsets are changes that a user can introduce, such as blendstock rundown rate change over some window, add, delete, or change product deliver window or rate, tank swing between segregations at some time, actual inventory error at some time, recipe change, blender downtime over some window, and blending rate differences from planned rate over some window.

The scheduler may be used to accomplish many management and other functions. The scheduler may be used to determine the implementation of aggregated production plans, to use run-time and historical data to track the actual progress of the schedule and hence the actual status of the aggregated production plans and alternate schedules and plans and to reconcile intended plans with actual results. Causal information about deviations from planned production can also be derived. Using the scheduler along with production plans allows the derivation of production targets, limits, goals, and economics for production operations, optimization and control. It also provides a means to integrate production planning with production operations.

Temporal relationships are explicitly included as continuous constraints in the schedule constraint model. Processing and process constraints and decisions are modeled as constraints on the control, manipulation, sensing and disturbance variables. A cost function is included in the constraint model that can be approximately optimized with respect to the constraints. Small temporal adjustments may be made due to operational variations as well as rescheduling when a requirement is violated. The assignment of discrete variables are ordered in the automatic search according to known problem bottlenecks and heuristics which may involve features of both the continuous and discrete constraint model. Constraint envelopes encode sets of possible schedules which may be partitioned or otherwise reduced during the problem solving process. Incremental feasibility checking, satisfaction and optimization is performed in an integrated discrete and continuous model.

CONCLUSION

A constraint envelope scheduling system has been described that integrates both discrete domain problem solver engines and continuous domain problem solver engines to enable the optimization of complex hybrid system scheduling. Constraints are modifiable by both engines and scheduling decisions are further represented as additional constraints. Dynamic backtracking provides the ability to dynamically modify schedules as infeasibilities, flow upsets, and suboptimal schedules are identified. Culprits are also identifiable, enabling intelligent rescheduling.

Constraint envelope scheduling is a least commitment approach to constraint based scheduling in which restrictions to the schedule are made only as necessary. Explicitly modeling scheduling decisions as additional constraints facilitates the design and implementation of schedulers that support iterative schedule negotiation and rescheduling, incremental schedule modification, conflict identification and repair, and on-line real time rescheduling in an operational environment.

The scheduling system described above may be used to control a number of different processes, including computer bus scheduling. In scheduling information flow on a bus, discrete parameters include task ad message sequencing, preemption and dataflow. Continuous parameters include task durations and throughput, context-switch overhead and latency and jitter constraints. The scheduling system would likely be modified to handle different discrete and continuous parameters for each different process it is applied to, but the overall integration of the engines and representations of constraints may remain fundamentally the same.

It is to be understood that the above description is intended to be illustrative, and not restrictive. Many other embodiments will be apparent to those of skill in the art upon reviewing the above description. For instance, while the invention was described in the context of a blending operation in a refinery, it is easily extendable to multiple different environments such as manufacturing automobiles and other products, scheduling of data traffic in a computer system and even in service industries where people resources are involved in multiple different tasks. Further domains, include airline services and airport ground operations, satellite and spacecraft operations, transportation and logistics planning, and air traffic management to name a few. It provides a flexible and efficient method to generate schedules in the face of thousands of discrete and continuous constraints. It also provides the ability to optimize plant resource utilization and to provide product in a timely fashion.

One skilled in the art can envision even further areas where the present invention would be useful. While the invention was described as being written in a particular software language, it will be apparent to those skilled in the art that other languages could be employed, and that the invention may be implemented in different combinations of software and hardware and may be run on many different computer platforms, as well as practiced without the use of a computer. The scope of the invention should, therefore, be determined with reference to the appended claims, along with the full scope of equivalents to which such claims are entitled.

What is claimed is:

1. A computer implemented method of scheduling orders for multiple different products or services, the method comprising:

creating a list of activities required to accomplish the orders;

modifying selected activities into sets of smaller activities; and scheduling the activities and smaller activities based on discrete and continuous constraints, wherein the continuous constraints are related to other variables by linear mathematical relationships, and wherein separate engines process the discrete and continuous constraints and propagate additional constraints to each other to produce a schedule for the activities.

2. The method of claim 1 wherein modifying selected activities is performed as a function of integrated implications of the discrete and continuous constraints.

3. The method of claim 1 wherein modifying selected activities comprises determining if an activity is larger than a predetermined threshold.

4. The method of claim 1 wherein modifying selected activities comprises determining if an activity occurs slower than a predetermined threshold.

5. The method of claim 1 and further comprising defining discrete and continuous constraints related to the activities based on requirements of the orders.

6. The method of claim 5 wherein activities are assigned start and end times.

7. The method of claim 5 wherein activities are scheduled based on deadlines.

8. The method of claim 5 wherein the requirements of the orders comprise identification of resources required to perform the orders.

9. The method of claim 8 wherein activities are assigned resources based on a resource balancing heuristic.

10. The method of claim 1 and further comprising identifying suboptimalities during the scheduling of activities and identifying culprit activities causing the suboptimalities.

11. The method of claim 1 wherein the schedule is modified by repeating the method after removing orders already completed.

12. A computer implemented method of scheduling tasks comprising:

creating a list of activities required to accomplish the tasks;
modifying selected activities into sets of smaller activities;
scheduling the activities and smaller activities based on discrete and continuous constraints;
identifying infeasibilities during the scheduling of activities;
identifying a culprit activity when an infeasibility is identified; and
chronological backtracking to the culprit activity which resulted in an infeasibility.

13. A computer implemented method of scheduling activities comprising:
defining discrete and continuous constraints related to the activities;
representing selected scheduling decisions as discrete and continuous constraints; and
scheduling activities in accordance with integrated implications of the discrete and continuous constraints, wherein separate engines process the discrete and continuous constraints and propagate additional constraints to each other to produce a schedule for the activities.

14. The method of claim 13 and further comprising:
scheduling activities in accordance with previous scheduling decision constraints;
identifying infeasibilities during the scheduling of activities; and
scheduling activities in accordance with identified infeasibilities.

15. The method of claim 14 and further comprising:
identifying a culprit activity which resulted in an infeasibility; and
backtracking to the culprit and rescheduling the culprit activity.

16. The method of claim 15 and further comprising identifying a culprit activity which resulted in a suboptimality.

17. A computer implemented method of scheduling activities comprising:
defining discrete and continuous constraints related to the activities;
representing selected scheduling decisions as discrete and continuous constraints;
scheduling activities in accordance with integrated implications of the discrete and continuous constraints;
scheduling activities in accordance with previous scheduling decision constraints;
identifying infeasibilities during the scheduling of activities;
scheduling activities in accordance with identified infeasibilities;
identifying a culprit activity which resulted in an infeasibility; and
chronological backtracking to the culprit and rescheduling the culprit activity.

18. A machine readable medium having computer executable instructions stored thereon for causing a computer to perform a method of scheduling tasks comprising:
creating a list of activities required to accomplish the tasks;
modifying selected activities into sets of smaller activities; and
scheduling the activities and smaller activities based on discrete and continuous constraints, wherein the continuous constraints are related to other variables by linear mathematical relationships, and wherein separate engines process the discrete and continuous constraints and propagate additional constraints to each other to produce a schedule for the activities.

19. A machine readable medium having computer executable instructions stored thereon for causing a computer to perform a method of scheduling activities comprising:
defining discrete and continuous constraints related to the activities, wherein the continuous constraints are related to other variables by linear mathematical relationships;
representing selected scheduling decisions as discrete and continuous constraints; and
scheduling activities in accordance with an integrated implications of the discrete and continuous constraints, and wherein separate engines process the discrete and continuous constraints and propagate additional constraints to each other to produce a schedule for the activities.

20. A memory for access by an application program for scheduling tasks being executed on a computing system comprising:
a continuous constraint solver engine;
a discrete constraint solver engine; and
means for integrating the engines to schedule activities to accomplish the tasks taking into account both continuous constraints and discrete constraints, wherein the continuous constraints are related to other variables by linear mathematical relationships, and wherein separate engines process the discrete and continuous constraints and propagate additional constraints to each other to produce a schedule for the activities.

* * * * *